United States Patent [19]

Müller et al.

[11] 4,024,946
[45] May 24, 1977

[54] TRANSVERSE MOVEMENT OF ELONGATED STOCK

[75] Inventors: Manfred Müller, Dusseldorf; Klaus-Peter Schirmag, Lintorf, both of Germany

[73] Assignee: Mannesmannrohren-Werke AG, Dusseldorf, Germany

[22] Filed: May 27, 1975

[21] Appl. No.: 580,917

[30] Foreign Application Priority Data

May 30, 1974 Germany .......................... 2426354

[52] U.S. Cl. ............................... 198/570; 198/774
[51] Int. Cl.² ......................................... B65G 37/00
[58] Field of Search ............. 198/1, 110, 218, 219, 198/107, 75, 570, 774; 214/1 P

[56] References Cited

UNITED STATES PATENTS

| | | |
|---|---|---|
| 3,322,259 | 5/1967 | Milazzo ............................. 198/219 |
| 3,355,008 | 11/1967 | Milazzo ............................. 198/219 |
| 3,512,628 | 5/1970 | Keough ............................. 198/219 |
| 3,850,287 | 11/1974 | Petros ............................. 198/219 |
| 3,869,040 | 3/1975 | Rice ............................. 198/219 |

Primary Examiner—John J. Love
Assistant Examiner—Joseph E. Valenza
Attorney, Agent, or Firm—Ralf H. Siegemund

[57] ABSTRACT

Pipes are moved transversely from one roller track to another one through two, bidirectional devices which in one example have a stationary and an up and down reciprocating member with shoes constructed to provide alternatingly downwardly inclined surfaces. Up and down movement results from pneumatic operation of an inflatable tube. The opposite direction of movement is provided for by a second up and down moving member with oppositely oriented roll-off surfaces.

5 Claims, 3 Drawing Figures

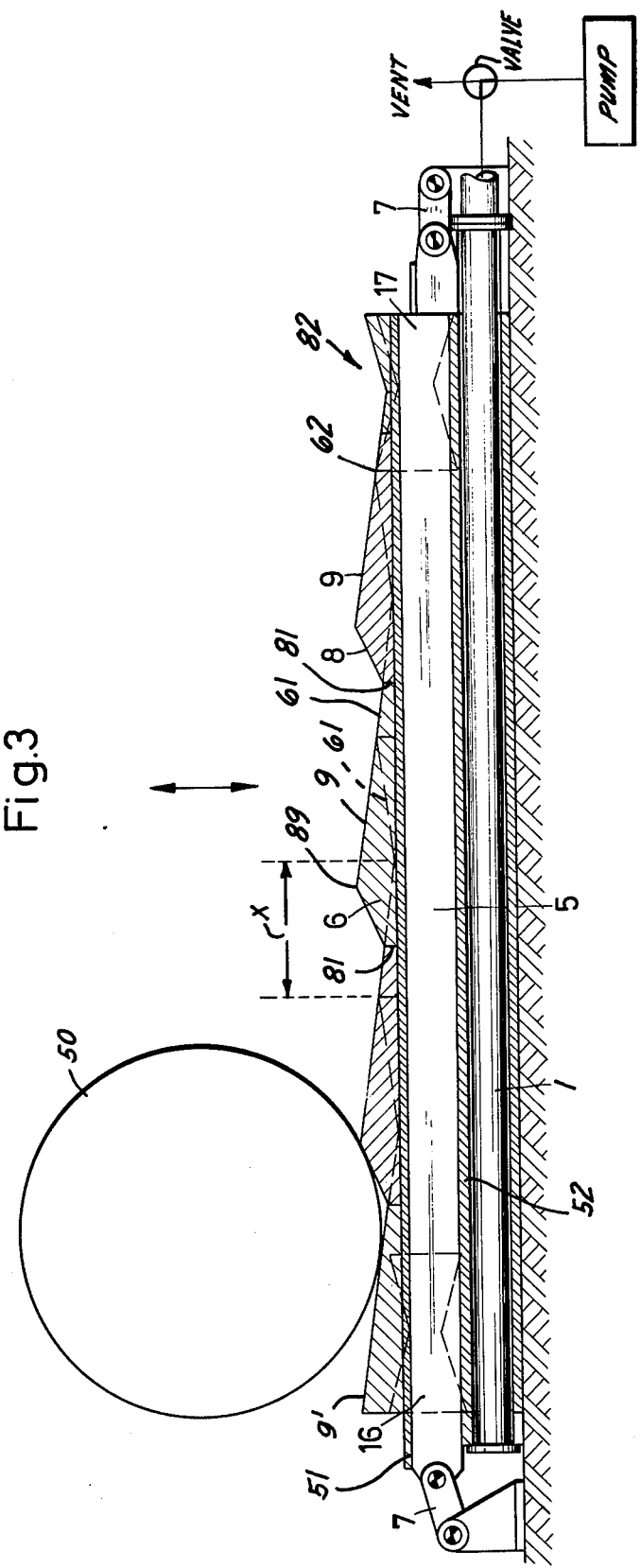

TRANSVERSE MOVEMENT OF ELONGATED STOCK

BACKGROUND OF THE INVENTION

The present invention relates to an apparatus for transversly moving elongated stock such as pipes.

An apparatus for moving elongated stock in transverse directions and on a reciprocating basis is shown for example in (U.S. Pat. No. 3,891,081 Ser. No. 496,574, filed Aug. 12, 1974) of one of us. In this patent, elongated rolls with cams rock back and forth to move a pipe transversely to its extension but in the direction of extension of the rolls, in that the pipe is placed alternatingly on staggeredly arranged roll off surfaces as defined by the cams.

DESCRIPTION OF THE INVENTION

It is an object of the present invention to provide a different kind of transverse transport and moving facility for elongated stock such as pipes in which a pipe being moved is not always supported by movable transport means and which is cushioned to avoid undue noise development and permits rather gentle handling.

In accordance with the preferred embodiment of the invention, it is suggested to provide a stationary member with cams or shoes and a vertically reciprocating member, also having shoes and wherein the vertical reciprocation results from inflating and deflating a flexible, hollow means, e.g. a hose or tube, disposed underneath this reciprocating member. Both members extend in the direction of transverse movement of the pipe.

The alternating reciprocating, up and down movement results in alternating support of the pipe by the shoes of the two members causing the pipe to move in one direction. Such a device will engage one end of a pipe. A duplicate device supports the other end of the pipe and moves it in the same fashion.

Bidirectional movement, i.e. a reversion of the direction of transport can be obtained in one of the following three ways. If the shoes on the up and down moving member have an asymmetrical contour with gradually sloping, roll down or roll off surfaces in the direction of movement but steep stop surfaces facing in the opposite direction, one may just reverse these shoes on the member to thereby change the direction of transportation. The shoes on the stationary member are preferably symmetrical with slopes corresponding to the gradually sloping portion of the shoes on the movable member.

The second way is a duplication of the movable member but with reversed shoes and only one of the movable members (per device) at a time is in operation.

The stationary (at least as far as up and down movement is concerned) member may likewise have an inflated support for cushioning. The inflating fluid may simply be air so that the lifting and lowering is the result of pneumatic action. For very heavy pipes, hydraulic fluid may be used in the alternative. As far as the up and down motion is concerned, all that is needed in the case of pneumatic operation, is to pump air in for lifting and venting the inflated tube for lowering which occurs otherwise just under the weight of the pipe.

The device in either configuration is composed of simple-to-make parts and the driving mechanism is particularly simple. Replacement and maintenance is simple, and wear as well as energy consumption is low. The movement of the pipes or the like is cushioned and not noisy.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a longitudinal section along lines 3—3 in FIGS. 1 and 2, on an intermediate scale;

Proceeding now to the detailed description of the drawings, FIGS. 1, 2 and 3 show a reversible transverse transporting facility for pipes or tubes 50. These tubes or pipes may arrive along a roller track 16 or be placed thereon by the facility; analogously there is a laterally displaced roler track 17 which receives pipes and moves them away from the transverse facility, or provides the pipes or tubes thereto. Thus, the illustrated facility links the two laterally displaced roller tracks 16 and 17 and permits transfer of elongated stock in either direction as between these tracks.

Figure 1:
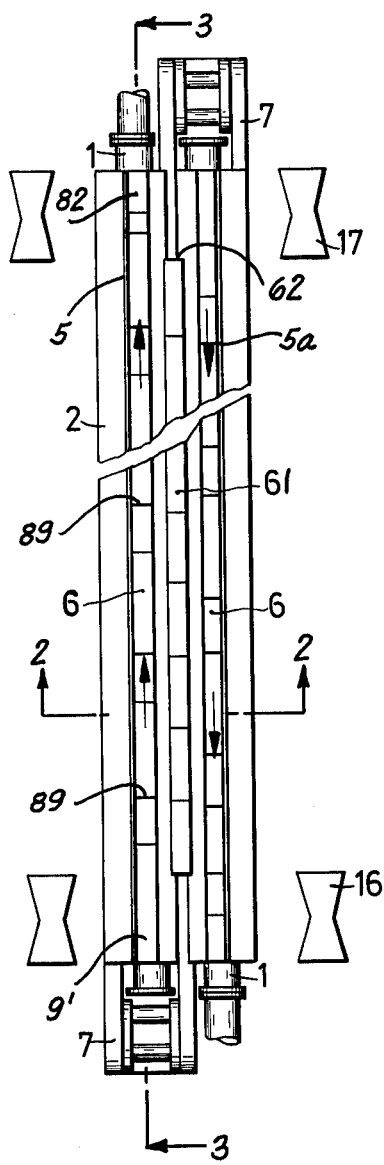
FIG. 1 is a plan elevation of a transport installation in accordance with the preferred embodiment of the invention.
Figure 1:
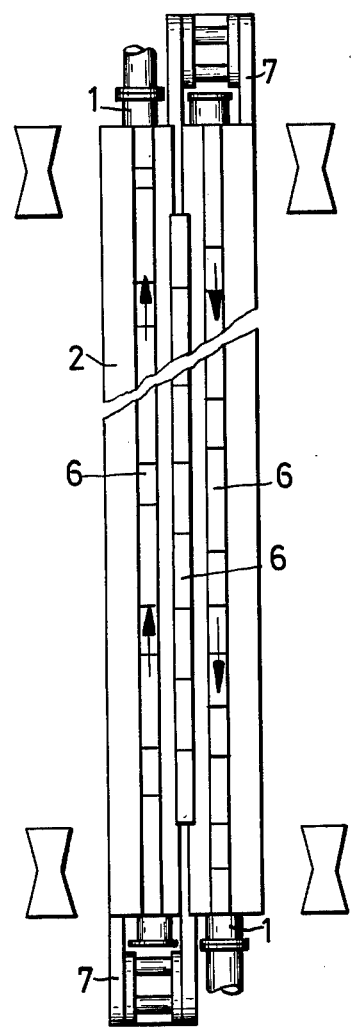

The transverse transport facility has two similar portions or devices spaced apart for a little less than the length of the tubes or pipes to be moved. They are similarly constructed so that tubes or pipes can be moved in either direction transversely to the extension of the roller tracks and under balanced conditions of support. Only one such device needs to be described in detail, because preferably the other one is an exact duplication.

The transverse transport devices each include a support or frame 2 constructed from lengthwise extending hollows 21, 22 and 23 defining respectively two protective chambers 24 between them. These chambers are open at the top and the resulting longitudinal opening is defined and bounded by members 25 which seal these chambers in slide fit with transport hollows 5 and 5a. The hollows 5 and 5a are of approximately square shaped cross-section and are vertically slidably guided in these chambers 24. Each hollow is therefore an up and down reciprocating member having a flat upper bar 51 and a lower reinforcing bar 52 by means of which each of the hollows are supported on hose or flexible tube 1 and 1a. These tubes or hoses are contained in protecting chambers 24 accordingly.

The center frame hollow 22 carries a tube or hose 3 on which in turn is slidably disposed a C-bar 4. The bar or bar shaped member 4 carries a plurality of, possibly, exchangably mounted transport shoes denoted with reference numeral 61. The shoes have the contour of upstanding isosceles triangles with a rather obtuse apex.

The running surfaces as defined by these shoes or cams establish, therefore, a travel path wherein up and down portions of equal length follow each other in alternating sequence. The up and down slopes are similar, whereby of course an up slope for one direction along bar 4 becomes a down slope for the opposite direction and vice versa. These directions are defined by the arrows in FIG. 1.

The hollows 5 and 5a are provided with shoes 6 flanking the center bar 4 with shoes 61. Shoes 6 are of sawtooth contour with steep stop surfaces 8 and gradually sloping surfaces 9 for roll off, whereby the slope of the latter is the same as the slope of the running surface of shoes 61.

The arrangement of the shoes 6 on hollow 5 as far as the orientation of surfaces 8 and 9 is concerned is reversed as compared with the arrangement of shoes 6 on hollow 5a. Thus, the shallow running surfaces 9 are of down sloping configuration for the direction of the arrow on the hollow 5 (and shoes 6) in FIG. 1, and the surfaces 9 define down slopes for movement (rolling off) of objects in the direction of the arrow on hollow 5a.

Considering the shoes and their relative disposition in some detail, the side by side relation of shoes 61 and 6 (on hollow 5) is such that any down slope of a shoe 61 extends from ahead of a valley point between two surface 9, 8 to beyond the apex point 89 of a shoe 6. This span is denoted $x$ in FIG. 3. There is no movement of machine parts in that direction, movement occurs only in direction of the vertical double arrow by operation of inflation of tube 1.

The shoes 61 have been dash dotted in FIG. 3 for purposes of explaining this phase relation. In reality these shoes are not visible in this particular view, nor behind the sectioned shoes 6. Rather, these shoes 61 would be in front of the illustrated viewing plane.

The first shoe 6 (adjacent roller track 16) has just one gradual down sloping surface 9', and the last apex at 62 of a shoe 61 occurs flush with the roller track 17, there being no gradual slope between that apex at that end 62, because a pipe will roll here on the protracted last shoe 82 of the shoes 6, before being disposed on the roller track 17. In conjunction therewith it should be mentioned that the individual rolls of tracks 16 and 17 have configuration of inverse double cones and the slope thereof is the same as of shoe 82, but inbetween the slopes of the surfaces of shoes 61 and the steep slope of the surfaces 8 on shoes 6.

As stated, the individual shoes 6 are replaceable and reference numeral 81 refers to vertical boundaries between adjacent shoes 6, as they are placed one behind the other. The upper end of each said boundary defines the valley point between a down slope 9 and an up slope 8. The shoes therefore, are of irregular pentagonal contour, but when placed as illustrated define a sawtooth pattern. It can readily be seen, that displaceability and removability of these shoes permits that they be turned around so that the orientation of the gradual down slopes and steep up slopes is reversed. As will be shown below, this change reverses the direction of movement of pipes along this device.

As stated above, tubes 1 and 1a can be inflated and deflated. For inflation, a valve (FIG. 3) connects an air pump to tube 1 until fully inflated, lifting the member 5 with shoes 6 to its upper most position. Upon changing the disposition of the valve, a venting outlet is connected to the tube 1 to gradually discharge the tube 1 under the weight of any object such as a pipe 50 resting thereon. Tubes 1 and 1a are not simultaneously inflated and deflated, so that in case tube 1a is to be inflated and deflated, tube 1 remains deflated while the pump feeds tube 1a. The valve connections are made accordingly.

The tube 3 is normally filled and remains so. However, the particular inflation and pressure establishes a particular level height for the shoes 61. Thus, the pressure applied and degree of filling and inflation of tube 3 is available as an adjustment for the height disposition of these shoes 61 which remain stationary otherwise during operation. The longitudinal movement of hollows 5, 5a is limited by means of thrust blocks 7.

Figure 2:
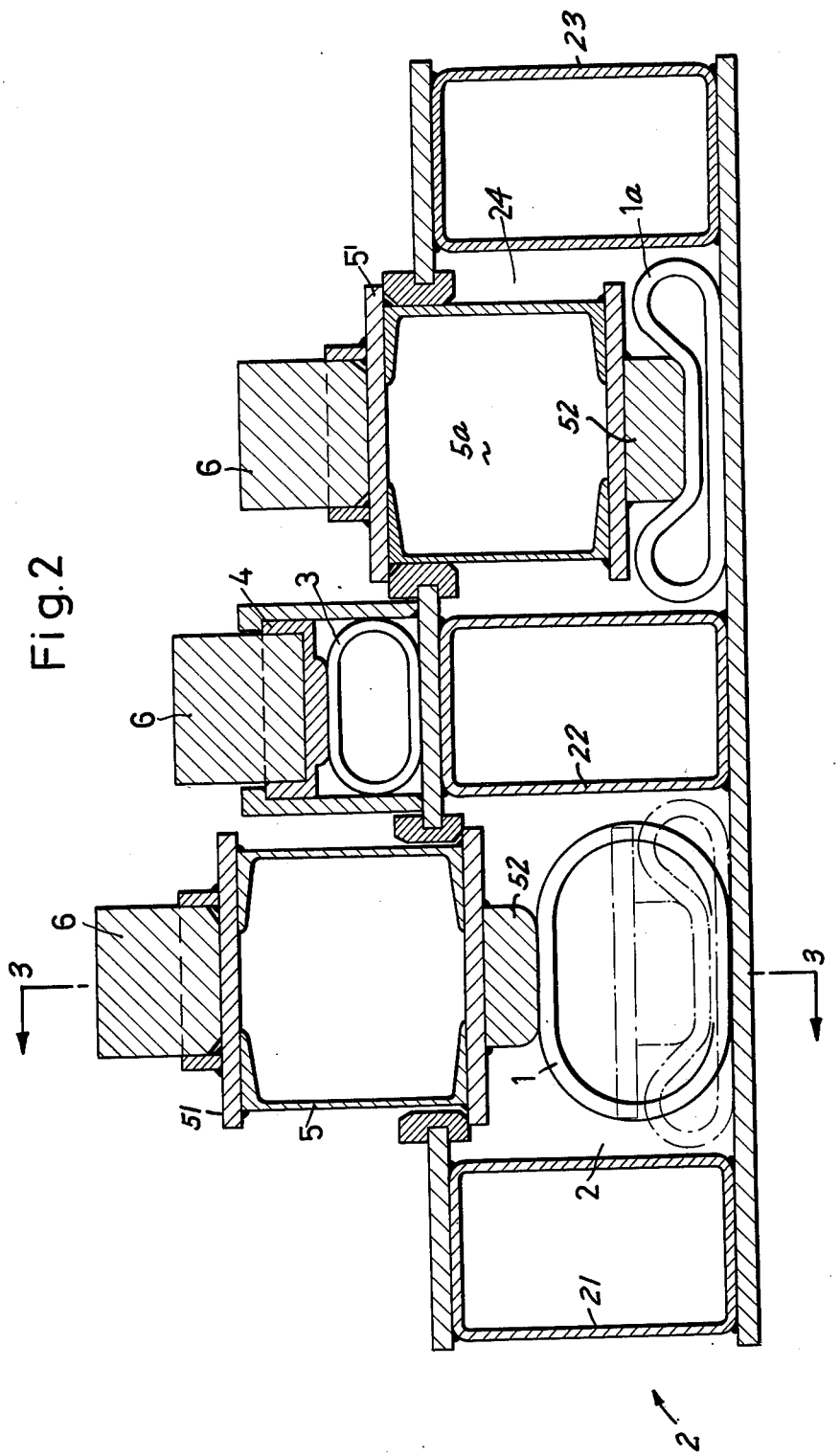
FIG. 2 is a cross-section along lines 2—2 in FIG. 1 on an enlarged scale.

FIG. 2 shows hose 1a completely deflated so that hollow member 5a together with its shoes is in fact completely receded in down direction. On the other hand, tube 1 is completely inflated placing hollow member 5 in the upper most position. In this position the peaks of shoes 6 are above those of shoes 61 and the shallow or gradually sloping surfaces 9 are laterally aligned with the surfaces of shoes 61 having the same disposition of orientation. FIG. 3 shows the same disposition.

During operation, a pipe 50 may arrive on roller track 16. The hollow member 5 may, at that point be also completely receded (deflation of tube 1 as shown in dash dot lines in FIG. 2). Next, tube 1 is inflated to raise hollow member 5 (one each for the two devices) and lifts the pipe 50 off track 16. The pipe 50 rolls along and down surface 9 of the first shoe 6, thereby rolling over the peak of the first shoe 61 on stationary member 4 until abutting stop 8 of the second shoe 6 on member 5. The member 5 is now being lowered by deflating tube 1, so that the pipe 50 can roll further, namely still along the down slope of that first shoe 61 on member 4 as roll off surface until reaching the bottom as between the first and second shoes 61 on member 4. The latter motion of the pipe rolls it in effect over the stop surface 8 and the peak of the second shoe 6 on lowered member 5. Thereafter the latter is protracted again in up direction by means of inflating tube 1 whereby the pipe 50 is lifted over the peak of the second shoe 61 on member 4 while rolling down along the slope of roll off surface 9 of the second shoe 6 on member 5 until abutting the stop surface 8 that pertains to the third shoe 6 on member 5.

It can thus be seen, that by alternatingly lifting and lowering member 5 through alternatingly inflating and deflating tube 1, a pipe 50 is moved along the devices towards roller track 17 until in the final step the pipe is placed on that track 17. The last down slope 9 of the last shoes 6 and the up slope of shoe 82 serve as positioning cradle here to place the pipe onto the track 17. The shoe pattern 61 has stopped before that point at 62.

The pressure medium (e.g., air) needs to be merely pumped into tube 1 and mere venting suffices for deflation because the weight of the pipe acts for forcing the medium out of the tube at a rate that can be controlled through the venting valve.

As was stated above, the direction of transportation is the opposite (i.e. from 17 to 16) if tube 1a is alternatingly lowered and raised while tube 1 remains deflated for downward retraction of member 5. The alternative mode of reversing the direction of transport requires merely the shoes on member 5 to be turned around. In that case, member 5a etc. is not needed. Whether one uses this duplication or changes the orientation of the shoes is a matter of purpose and speed. If sufficient time is available to turn the shoes around, the omission of member 5a, tube 1a etc. is clearly a saving in cost. However, high speed operation may require rapid reversion of direction within a larger system of moving pipes e.g. more or less on a continuous basis. In that case, operational reversibility may be required and the illustrated device suits that purpose.

The invention is not limited to the embodiments described above but all changes and modifications thereof not constituting departures from the spirit and scope of the invention are intended to be included.

We claim:

1. In an apparatus for transversely moving elongated stock, such as pipes, a device comprising:
    a first elongated member extending in the direction of desired transportation and having a plurality of shoes defining an alternating sequence of oppositely inclined stop and roll-off surfaces;
    a second elongated member placed along-side of said first member and having a plurality of stationary, asymmetrical shoes defining an alternating sequence of oppositely inclined, relatively steep stop surfaces and more gradually inclined roll-off surfaces and arranged to be offset in the said direction and in relation to the shoes of the first member in that neither crests nor valleys of the shoes of one of the members are laterally aligned with valleys or crests of the respective other member;
    a third member also placed alongside said first member and having shoes similar to the shoes of the second member but with reversed orientation as to the stop and roll-off surfaces;
    first tubular, inflatable and deflatable means for supporting the second member to move the second member up and down in the offset positions of the shoes so that the stock rolls on the roll-off surfaces of the shoes of the first member and on the roll-off surfaces of the shoes of second member in alternating sequence; and
    second tubular inflatable and deflatable means for supporting the third member to move the third member up and down so that the stock rolls on the roll-off surfaces in directions opposite to the direction of rolling by operation of the tubular means operating the second member; only one of the second and third members at a time moving up and down while the respective other one is held down.

2. In an apparatus as in claim 1, the first member being supported on a tubular, inflated means for providing cushioning of the shoes of the first member.

3. In an apparatus as in claim 1, wherein the shoes on the second member are removably mounted, for reversing the orientation of their surfaces.

4. In an apparatus for transversely moving elongated stock, such as pipes, a device comprising:
    a first elongated member extending in the direction of desired transportation and provided for stepwise transport of the stock in two opposite directions;
    a second elongated member placed alongside of said first member and constructed for stepwise transport of stock in one of said two directions, and arranged so that the stepwise operation of the two members becomes alternatingly effective;
    a third elongated member also placed alongside of the first member and constructed for stepwise transport of stock in the opposite one of said two directions and arranged so that the stepwise operation of the first and third members becomes alternatingly effective;
    first tubular, inflatable and deflatable means for supporting the second member to move the second member up and down so that the stock is moved in the one direction by the first member and by the second member in alternating sequence;
    second tubular, inflatable and deflatable means for supporting the third member to move the third member up and down so that the stock is moved by the first member in the opposite direction, and by the third member in alternating sequence resulting in a movement of the stock in said opposite direction; means for controlling inflation and deflation of the first or of the second means; and
    a protective frame containing said means and provided for guiding the up and down movements of the second and third members.

5. In an apparatus as set forth in claim 4, wherein the first and second members have shoes which define alternatingly effective roll off surfaces.

* * * * *